(12) United States Patent
Becker et al.

(10) Patent No.: US 9,721,713 B2
(45) Date of Patent: Aug. 1, 2017

(54) ELECTROMAGNETIC SOLENOID WITH INCLINED POLE FACES

(71) Applicant: Schaeffler Technologies AG & Co. KG, Herzogenaurach (DE)

(72) Inventors: David Becker, Walled Lake, MI (US); Brian Lee, York, SC (US); Markus Raith, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/699,691

(22) Filed: Apr. 29, 2015

(65) Prior Publication Data

US 2016/0322148 A1 Nov. 3, 2016

(51) Int. Cl.
| | | |
|---|---|---|
| *H01F 7/16* | (2006.01) |
| *H01F 7/08* | (2006.01) |
| *F16D 27/112* | (2006.01) |
| *F16D 27/14* | (2006.01) |
| *H01F 7/17* | (2006.01) |

(52) U.S. Cl.
CPC ............ *H01F 7/081* (2013.01); *F16D 27/112* (2013.01); *F16D 27/14* (2013.01); *H01F 7/17* (2013.01); *H01F 2007/086* (2013.01)

(58) Field of Classification Search
CPC .......... H01F 7/1638; H01F 7/08; H01F 7/081; H01F 7/17; H01F 2007/086; F16D 27/00; F16D 27/112; F16D 27/14
See application file for complete search history.

(56) References Cited

U.S. PATENT DOCUMENTS

| | | | | |
|---|---|---|---|---|
| 7,280,021 B2* | 10/2007 | Nagasaki | ............. | H01F 7/1607 335/227 |
| 7,785,224 B2 | 8/2010 | York et al. | | |
| 8,973,894 B2* | 3/2015 | Ozaki | ................. | F16K 31/0655 251/129.15 |
| 2004/0257185 A1* | 12/2004 | Telep | .................... | H01F 7/1607 335/220 |

* cited by examiner

*Primary Examiner* — Bernard Rojas
(74) *Attorney, Agent, or Firm* — Volpe and Koenig, P.C.

(57) ABSTRACT

An electromagnetic solenoid assembly is disclosed. The solenoid assembly includes a cup-shaped ring defining a pocket for an annular coil, and including a radially extending portion, a radially inner axially extending flange, and a radially outer axially extending flange. An axially outer end of the radially outer axially extending flange includes a first inclined surface and an axially outer end of the radially inner axially extending flange includes a second inclined surface. A ring-shaped armature includes a radially outer portion and a radially inner portion. An axially outer end of the radially outer portion includes a third inclined surface and an axially outer end of the radially inner portion includes a fourth inclined surface. Pairs of the inclined surfaces are aligned substantially parallel to each other. A distance between the ring-shaped armature and the cup-shaped ring is variable based on energizing the annular coil.

11 Claims, 6 Drawing Sheets

ELECTROMAGNETIC SOLENOID WITH INCLINED POLE FACES

FIELD OF INVENTION

This invention is generally related to a disconnect clutch, and is more particularly related to an electromagnetic solenoid for a disconnect clutch.

BACKGROUND

Electromagnetic solenoids are used in a variety of applications, including all-wheel drive clutches. One known type of electromagnetic solenoid is disclosed in U.S. Pat. No. 7,785,224. These known types of electromagnetic solenoids include an armature and a cup-shaped ring including an annular coil housed therein. A distance between the armature and the cup-shaped ring is controlled by the energization state of the annular coil. In known electromagnetic solenoids for clutches, the armature and cup-shaped ring typically include flat axially extending pole ends facing each other. FIGS. 1 and 2 show an electromagnetic solenoid 1 according to the prior art. As shown in FIGS. 1 and 2, the electromagnetic solenoid 1 includes a cup-shaped ring 5 and a ring-shaped armature 7, each including flat pole ends facing one another. In this embodiment, the flat pole ends on the cup-shaped ring and armature provide a higher attractive force when the armature and cup-shaped ring are closer to each other, i.e. at a smaller stroke distance. As the distance between the armature and cup-shaped ring increases, i.e. at a larger stroke distance, the attractive force between the armature and cup-shaped ring due to the energized annular coil precipitously decreases. It would be desirable to provide an electromagnetic solenoid assembly including mating pole end faces that maintain a more constant attractive force between the armature and cup-shaped ring as the distance between the armature and cup-shaped ring increases and the stroke increases.

SUMMARY

It would be desirable to provide an electromagnetic solenoid assembly having an improved pole end configuration that provides more attractive force at longer stroke distances. This is achieved by providing an electromagnetic solenoid including a cup-shaped ring and ring-shaped armature with pairs of substantially parallel inclined surfaces. The electromagnetic solenoid includes a cup-shaped ring defining a pocket, and including a radially extending portion, a radially inner axially extending flange, and a radially outer axially extending flange. An axially outer end of the radially outer axially extending flange includes a first inclined surface and an axially outer end of the radially inner axially extending flange includes a second inclined surface. An annular coil is arranged in the pocket of the cup-shaped ring. A ring-shaped armature is arranged adjacent to the cup-shaped ring and includes a radially outer portion and a radially inner portion. An axially outer end of the radially outer portion includes a third inclined surface and an axially outer end of the radially inner portion includes a fourth inclined surface. The first inclined surface and the third inclined surface are substantially parallel to each other and axially aligned with each other, and the second inclined surface and the fourth inclined surface are substantially parallel to each other and axially aligned with each other. A distance between the ring-shaped armature and the cup-shaped ring is variable based on an energized state of the annular coil.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
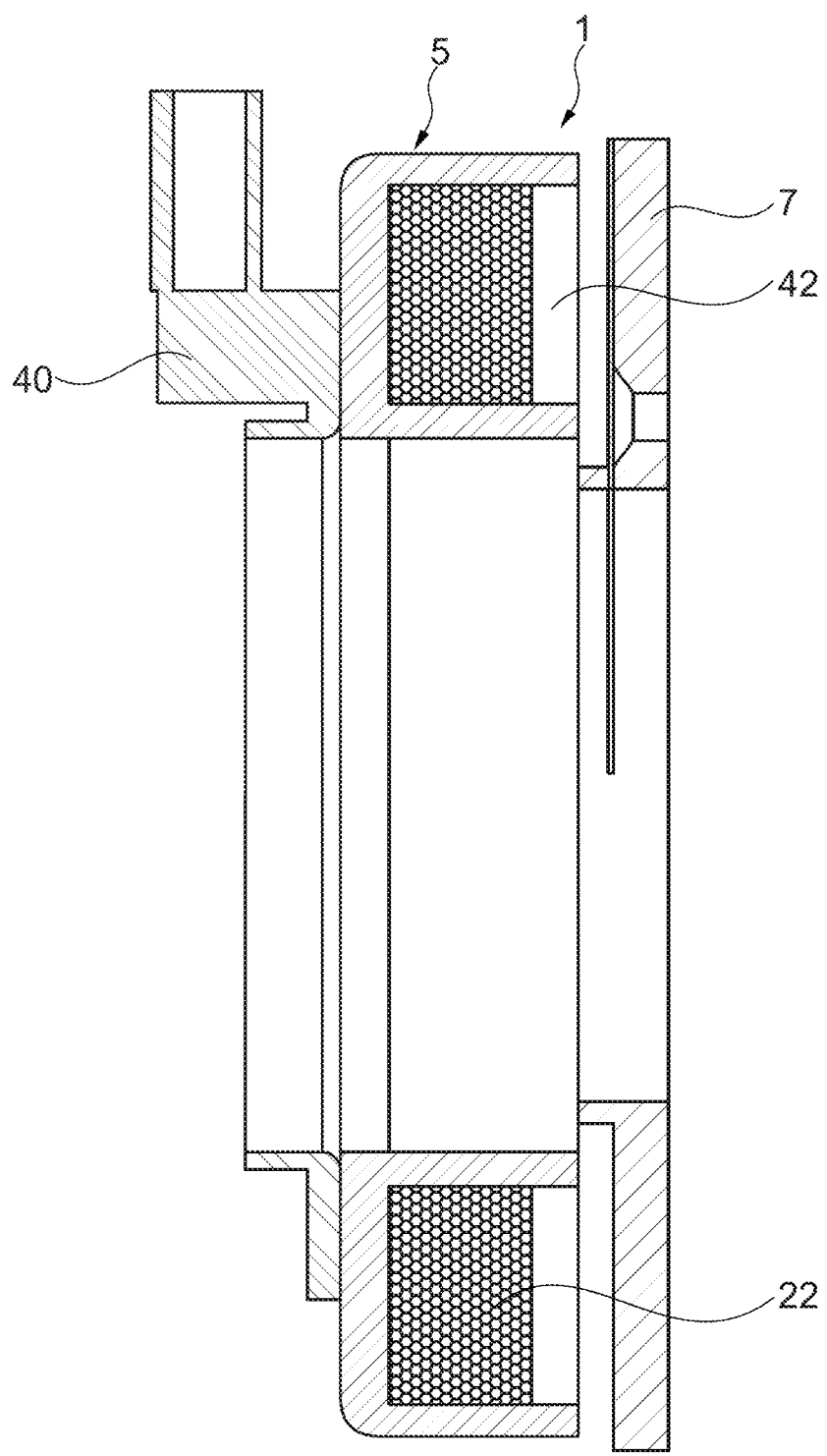
FIG. 1 is a side cross-sectional view of an electromagnetic solenoid assembly including flat pole surfaces according to the prior art.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 3A:
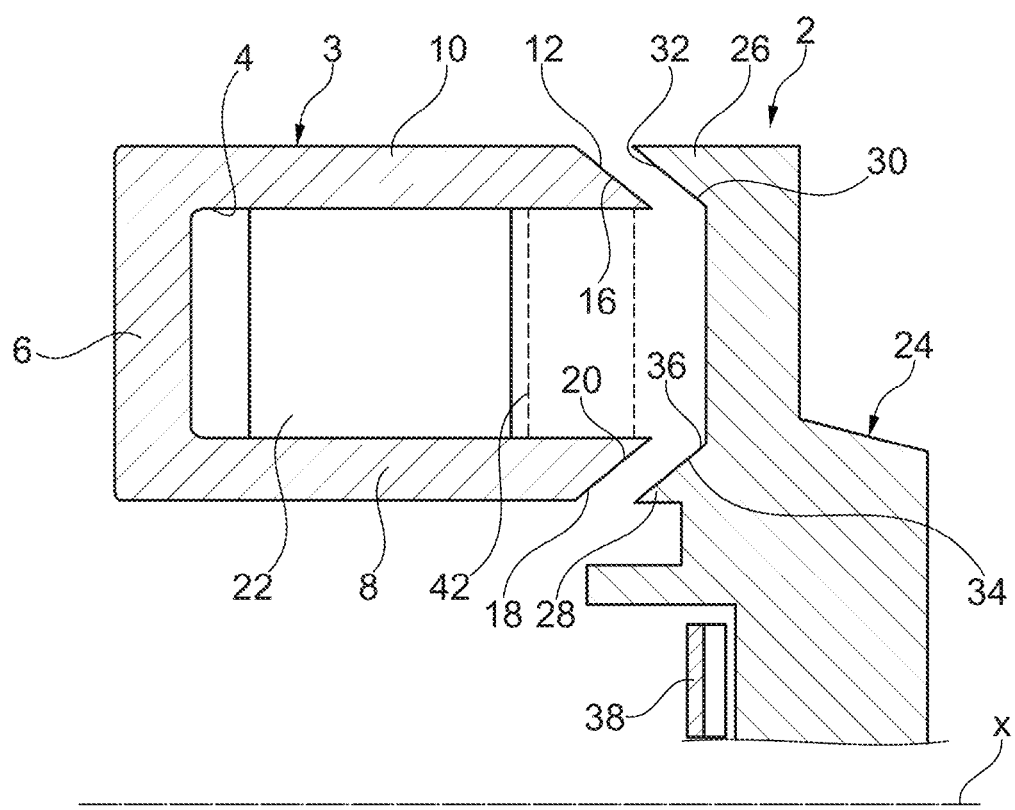
FIGS. 3A and 3B show side cross-sectional views of a portion of an electromagnetic solenoid assembly according to a first embodiment in a de-energized and an energized state, respectively.
Figure 3B:
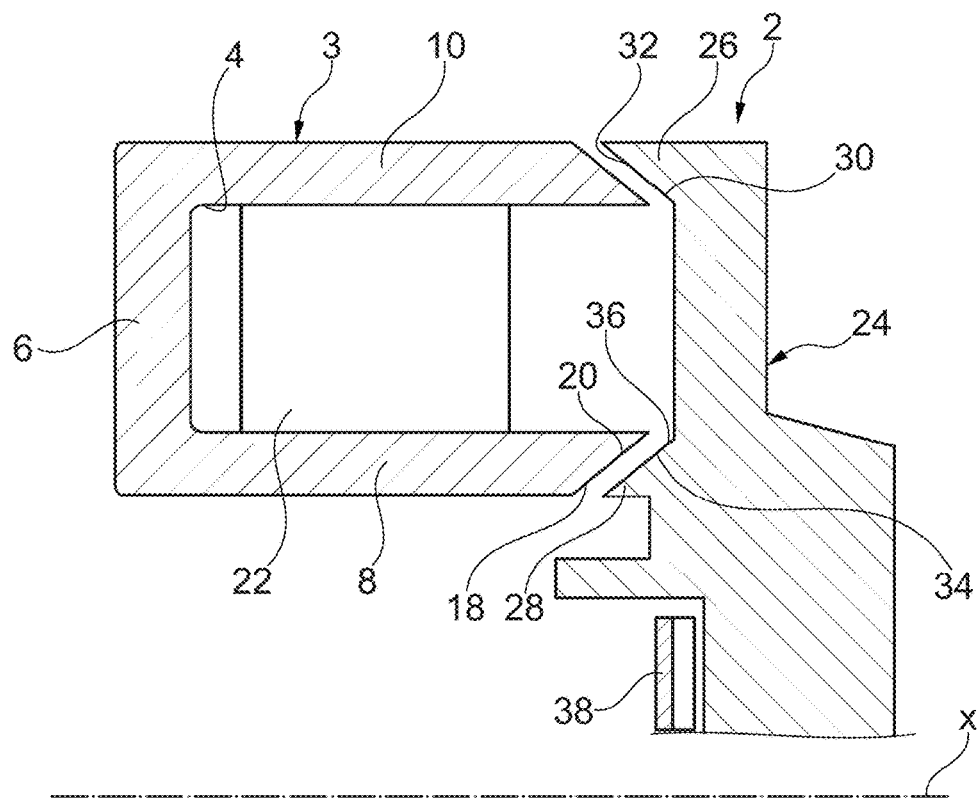
Figure 4:
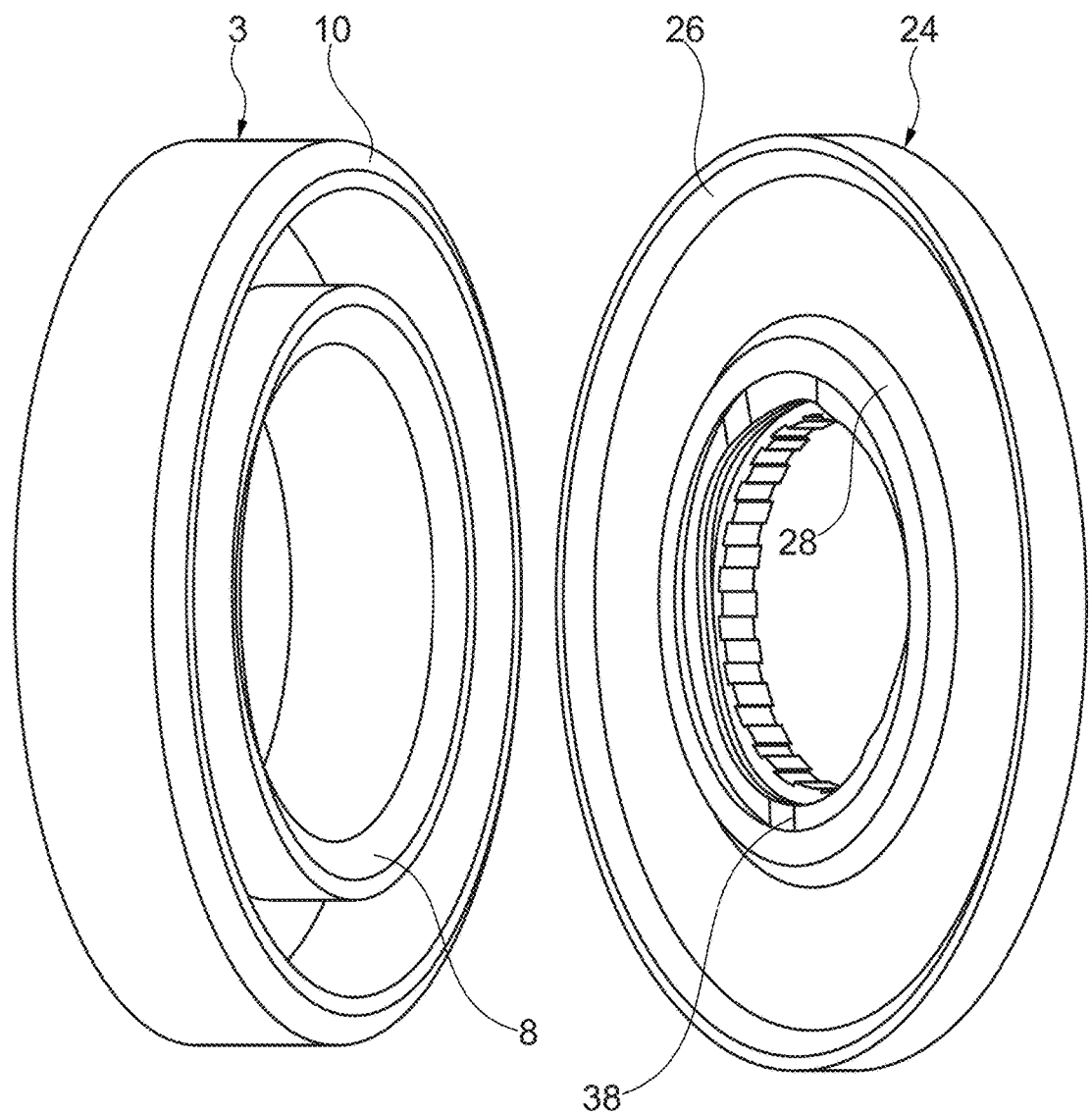
FIG. 4 is a perspective view of a cup-shaped ring and a ring-shaped armature of the electromagnetic solenoid arrangement of FIGS. 3A and 3B prior to assembly.

As shown in FIGS. 3A, 3B, and 4, an electromagnetic solenoid assembly 2 is disclosed. The electromagnetic solenoid assembly 2 includes a cup-shaped ring 3 defining a pocket 4. An annular coil 22 is arranged in the pocket 4 of the cup-shaped ring 3. The cup-shaped ring 3 includes a radially extending portion 6, a radially inner axially extending flange 8, and a radially outer axially extending flange 10. An axially outer end 12 of the radially outer axially extending flange 10 includes a first inclined surface 16 and an axially outer end 18 of the radially inner axially extending flange 8 includes a second inclined surface 20. These first and second inclined surfaces 16, 20 are preferably inclined toward one another.

A ring-shaped armature 24 is arranged adjacent to the cup-shaped ring 3. The ring-shaped armature 24 includes a radially outer portion 26 and a radially inner portion 28. An axially outer end 30 of the radially outer portion 26 includes a third inclined surface 32 and an axially outer end 34 of the radially inner portion 28 includes a fourth inclined surface 36. As shown in FIGS. 3A and 3B, a distance between the ring-shaped armature 24 and the cup-shaped ring 3 is variable based on an energized state of the annular coil 22.

The first inclined surface 16 and the third inclined surface 32 are substantially parallel to and axially aligned with each other, and the second inclined surface 20 and the fourth inclined surface 36 are substantially parallel to and axially aligned with each other. This configuration provides a smaller air gap between the opposing faces of the ring-shaped armature 24 and the cup-shaped ring 3, allowing for increased magnetic attractive forces at longer stroke distances. In a preferred embodiment, the axially outer end 12 of the radially outer axially extending flange 10 of the cup-shaped ring 3 is partially co-planar in a radial direction (i.e., a radial plane would intersect the axially outer ends 12, 30) with the axially outer end 30 of the radially outer portion 26 of the ring-shaped armature 24. In a preferred embodiment, the axially outer end 18 of the radially inner axially extending flange 8 of the cup-shaped ring 3 is partially co-planar in a radial direction (i.e., a radial plane would intersect the axially outer ends 18, 34) with the axially outer end 34 of the radially inner portion 28 of the ring-shaped armature 24. The attractive forces between respective pairs of the inclined surfaces on the cup-shaped ring 3 and the ring-shaped armature 24 are increased at longer stroke distances, as compared to previously known solenoid arrangements including flat surface ends, due to the overlapping configuration of the outer most axial ends of the radial portions of the cup-shaped ring 3 and the ring-shaped armature 24.

Figure 5A:
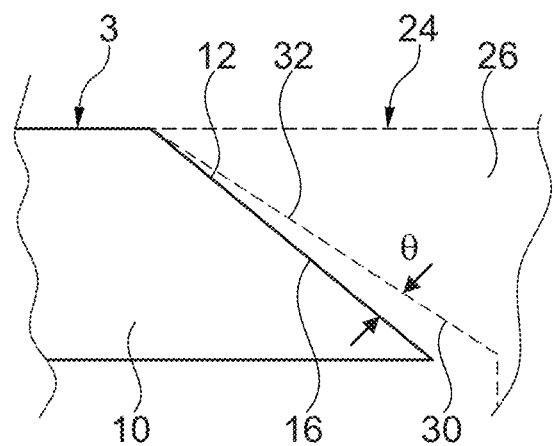
FIGS. 5A and 5B show magnified side cross-sectional views of portions of an electromagnetic solenoid assembly according to an embodiment.
Figure 5B:
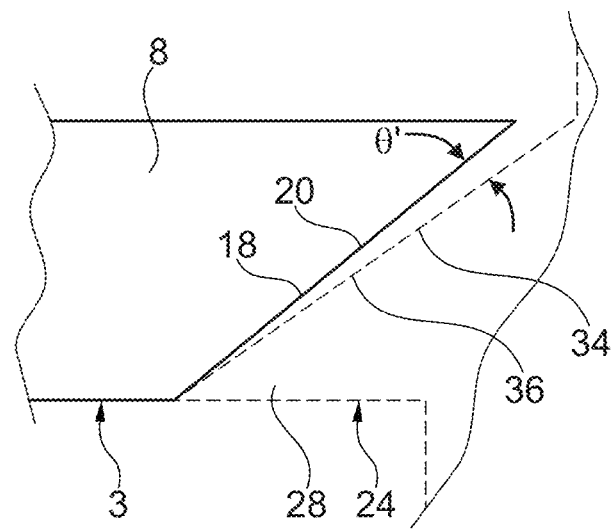

In one embodiment shown in FIG. 5A, a first angle differential (θ) between the first inclined surface 16 and the third inclined surface 32 is between 0.5-2.5 degrees. FIG. 5A shows the ring-shaped armature 24 in broken lines and touching the cup-shaped ring 3 at one end. This first angle differential (θ) is included within the description of the inclined surfaces 16, 32 being substantially parallel. In one embodiment shown in FIG. 5B, a second angle differential (θ') between the second inclined surface 20 and the fourth inclined surface 26 is between 0.5-2.5 degrees. Similar to FIG. 5A, the ring-shaped armature 24 is shown in broken lines in FIG. 5B. This second angle differential (θ') is also included within the description of the inclined surfaces 20, 26 being substantially parallel.

In one embodiment, the ring-shaped armature 24 is displaceable relative to the cup-shaped ring 3 between a first position when the annular coil 22 is de-energized, and a second position when the annular coil 22 is energized. In one embodiment shown in FIGS. 3A, 3B, and 4, a biasing member 38 biases the ring-shaped armature 24 toward the first position. FIG. 3A shows the annular coil 22 in a de-energized state, and the biasing member 38 biases the ring-shaped armature 24 away from the cup-shaped ring 3. In one embodiment, the biasing member 38 is a wave-type annular spring. One of ordinary skill in the art will recognize that alternative biasing members can be used.

Figure 2:
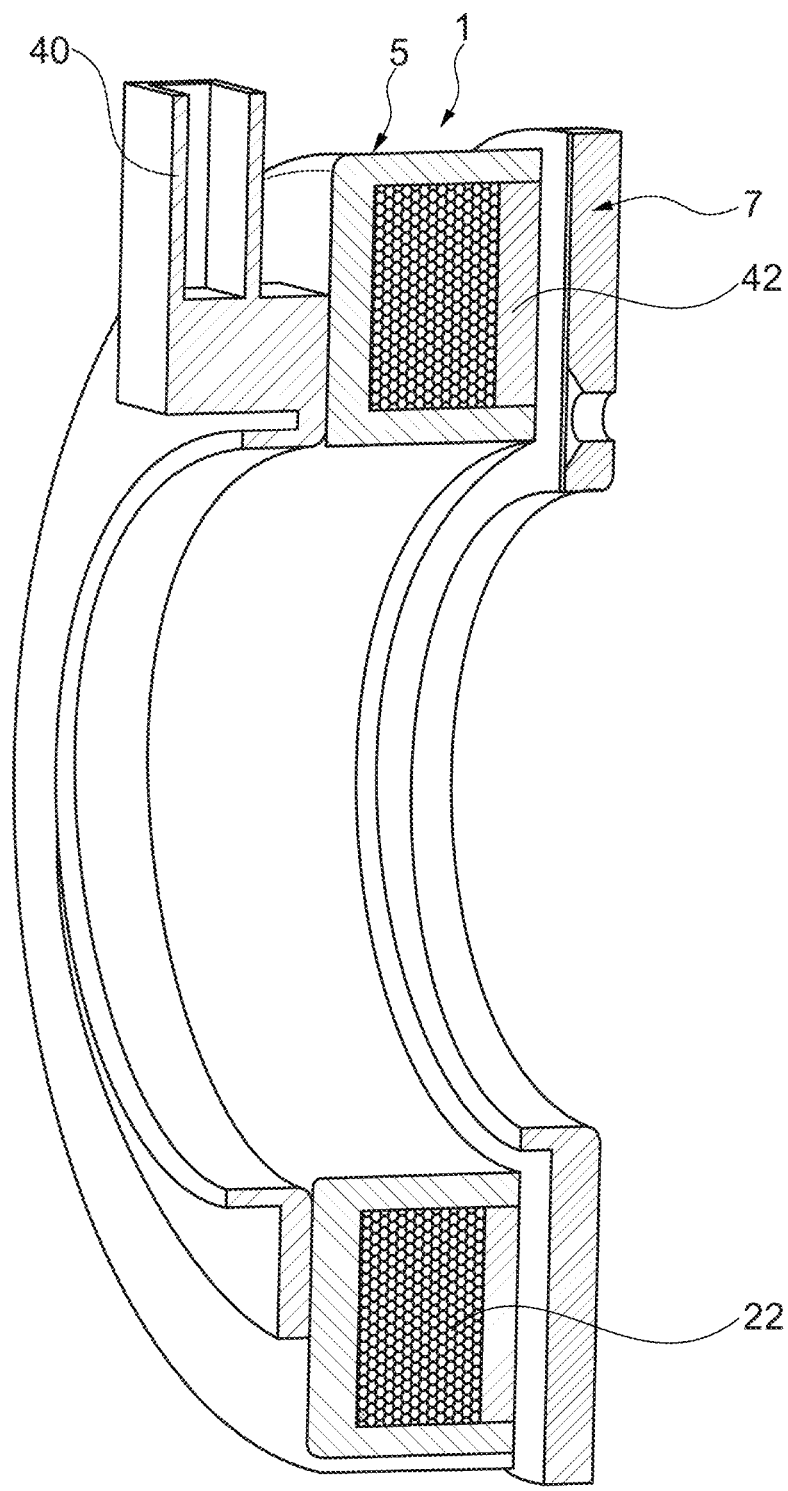
FIG. 2 is a perspective view of the electromagnetic solenoid assembly of FIG. 1.

FIGS. 1 and 2 show a housing 40 including electrical connectors for energizing the annular coil 22 connected to the cup-shaped ring 3. FIGS. 1 and 2 also show a cover ring 42 arranged in the pocket 4 of the cup-shaped ring 3 between the annular coil 22 and the ring-shaped armature 7. One of ordinary skill in the art will recognize that the housing 40 or cover ring 42 can be included in the embodiment of FIGS. 3A, 3B, and 4. The cover ring 42 is shown in broken lines in FIG. 3A.

Having thus described various embodiments of the present electromagnetic solenoid assembly in detail, it is to be appreciated and will be apparent to those skilled in the art that many changes, only a few of which are exemplified in the detailed description above, could be made in the device without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. An electromagnetic solenoid assembly comprising:
   a cup-shaped ring defining a pocket, and including a radially extending portion, a radially inner axially extending flange, and a radially outer axially extending flange, an axially outer end of the radially outer axially extending flange includes a first inclined surface and an axially outer end of the radially inner axially extending flange includes a second inclined surface;
   an annular coil arranged in the pocket of the cup-shaped ring;
   a ring-shaped armature arranged adjacent to the cup-shaped ring, the ring-shaped armature including a radially outer portion and a radially inner portion, an axially outer end of the radially outer portion includes a third inclined surface and an axially outer end of the radially inner portion includes a fourth inclined surface;
   the first inclined surface and the third inclined surface are substantially parallel to and axially aligned with each other, and the second inclined surface and the fourth inclined surface are substantially parallel to and axially aligned with each other, and the first inclined surface, the second inclined surface, the third inclined surface, and the fourth inclined surface each consist of a single flat surface; and
   a distance between the ring-shaped armature and the cup-shaped ring is variable based on an energization state of the annular coil, wherein an angle differential between (1) the first inclined surface and the third inclined surface, or (2) the second inclined surface and the fourth inclined surface is between 0.5-2.5 degrees.

2. The electromagnetic solenoid assembly of claim 1, wherein the ring-shaped armature is movable relative to the cup-shaped ring between a first position when the annular coil is de-energized, and a second position when the annular coil is energized, and a biasing member biases the ring-shaped armature toward the first position.

3. The electromagnetic solenoid assembly of claim 1, further comprising a housing connected to the cup-shaped ring.

4. The electromagnetic solenoid assembly of claim 1, further comprising a cover ring arranged in the pocket of the cup-shaped ring between the annular coil and the ring-shaped armature.

5. The electromagnetic solenoid assembly of claim 1, wherein the axially outer end of the radially outer axially extending flange of the cup-shaped ring is partially co-planar in a radial direction with the axially outer end of the radially outer portion of the ring-shaped armature.

6. The electromagnetic solenoid assembly of claim 1, wherein the axially outer end of the radially inner axially extending flange of the cup-shaped ring is partially co-planar in a radial direction with the axially outer end of the radially inner portion of the ring-shaped armature.

7. The electromagnetic solenoid assembly of claim 1, wherein the angle differential is a first angle differential between the first inclined surface and the third inclined surface is between 0.5-2.5 degrees.

8. The electromagnetic solenoid assembly of claim 1, wherein the angle differential is a second angle differential between the second inclined surface and the fourth inclined surface is between 0.5-2.5 degrees.

9. An electromagnetic solenoid assembly comprising:
a cup-shaped ring defining a pocket, including a radially extending portion, a radially inner axially extending flange, and a radially outer axially extending flange, an axially outer end of the radially outer axially extending flange includes a first inclined surface and an axially outer end of the radially inner axially extending flange includes a second inclined surface, the cup-shaped ring being integrally formed with a housing;
an annular coil arranged in the pocket of the cup-shaped ring;
a ring-shaped armature arranged adjacent to the cup-shaped ring, the ring-shaped armature including a radially outer portion and a radially inner portion, an axially outer end of the radially outer portion includes a third inclined surface and an axially outer end of the radially inner portion includes a fourth inclined surface;
a biasing member arranged between the cup-shaped ring and the ring-shaped armature;
a cover ring arranged in the pocket of the cup-shaped ring between the annular coil and the ring-shaped armature;
the first inclined surface and the third inclined surface are substantially parallel to and axially aligned with each other, and the second inclined surface and the fourth inclined surface are substantially parallel to and axially aligned with each other, and the first inclined surface, the second inclined surface, the third inclined surface, and the fourth inclined surface each consist of a single flat surface; and
a distance between the ring-shaped armature and the cup-shaped ring is variable based on an energization state of the annular coil, wherein an angle differential between (1) the first inclined surface and the third inclined surface, or (2) the second inclined surface and the fourth inclined surface is between 0.5-2.5 degrees.

10. The electromagnetic solenoid assembly of claim 9, wherein the ring-shaped armature is movable relative to the cup-shaped ring between a first position when the annular coil is de-energized, and a second position when the annular coil is energized, and the biasing member biases the ring-shaped armature toward the first position.

11. The electromagnetic solenoid assembly of claim 9, wherein the axially outer end of the radially outer axially extending flange of the cup-shaped ring is partially co-planar in a radial direction with the axially outer end of the radially outer portion of the ring-shaped armature.

* * * * *